United States Patent [19]

Tsui

[11] 4,438,077

[45] Mar. 20, 1984

[54] TWO STAGE SELECTIVE OXIDATIVE LEACH METHOD TO SEPARATELY RECOVER URANIUM AND REFRACTORY URANIUM-MINERAL COMPLEXES

[75] Inventor: Tien-Fung Tsui, Richardson, Tex.

[73] Assignee: Mobil Oil Corporation, New York, N.Y.

[21] Appl. No.: 372,419

[22] Filed: Apr. 27, 1982

[51] Int. Cl.³ .................... C01G 43/00; C01G 31/00; C22B 60/02; C22B 34/22
[52] U.S. Cl. ............................................ 423/7; 423/3; 423/8; 423/10; 423/17; 423/20; 423/63; 423/68; 299/4; 299/5
[58] Field of Search ................ 423/3, 17, 18, 20, 63, 423/68, 7, 8, 10; 299/5, 4

[56] References Cited

U.S. PATENT DOCUMENTS

| | | | |
|---|---|---|---|
| 1,129,029 | 2/1915 | Voet | 423/17 |
| 1,945,611 | 2/1934 | Knight et al. | 423/17 X |
| 2,630,369 | 3/1953 | Burwell | 423/17 |
| 2,756,122 | 7/1956 | McLean | 423/18 |
| 3,168,370 | 2/1965 | Reusser | 423/3 |
| 4,155,892 | 5/1979 | Hunkin et al. | 423/17 X |
| 4,206,182 | 6/1980 | Lafforgue et al. | 423/3 X |
| 4,346,936 | 8/1982 | Yan | 423/17 X |

OTHER PUBLICATIONS

Merritt, R. C., *The Extractive Metallurgy of Uranium*, Colorado School of Mines Research Institute, 1971, pp. 52, 61–63, 83, 342–343, 471.

*Primary Examiner*—Deborah L. Kyle
*Assistant Examiner*—Matthew A. Thexton
*Attorney, Agent, or Firm*—A. J. McKillop; M. G. Gilman; John K. AboKhair

[57] ABSTRACT

The present invention relates to a process for the recovery of uranium and other minerals from uranium ore where at least part of the uranium is present as refractory uranium-mineral complexes, comprising subjecting the uranium ore to mild oxidative carbonate leach fluid to dissolve and remove readily soluble uranium minerals, subsequently subjecting the uranium ore to an oxidative chemically severe leaching system to dissolve and remove the refractory uranium-mineral complexes, and separating and recovering the uranium and other mineral species in the leachate fluids. The process may be applied to in-situ uranium leaching operations or to surface leaching operations.

19 Claims, No Drawings

TWO STAGE SELECTIVE OXIDATIVE LEACH METHOD TO SEPARATELY RECOVER URANIUM AND REFRACTORY URANIUM-MINERAL COMPLEXES

FIELD OF THE INVENTION

The present invention relates to an improved process for the selective leaching of mineral values from ores containing the same. More specifically, the invention relates to a novel two-stage process for the selective leaching of uranium values from ores additionally containing other minerals such as vanadium.

BACKGROUND OF THE INVENTION

In a uranium recovery process, the uranium ore is subjected to an extraction process wherein the minerals found in the ore are extracted by a leaching solution. The pregnant leachate is subjected to purification and concentration processes to be followed by a precipitation process wherein the mineral values are precipitated.

The association of uranium with other ore constituents such as vanadium, molybdenum, copper, and thorium may require that special purification processes be included in the process in order to avoid certain processing problems and to prevent contamination of the uranium product. As a result, these additional constituents may become sufficiently concentrated at some point in the process to justify further treatment and the subsequent production of valuable by-products. These by-products sometimes reach a value equal to or possibly greater than that of the uranium, and the process then is usually designed for parallel production of both commodities. This is the case, for example, with ores in the Uraven Mineral Belt which are high in vanadium content.

Several known processes for the treatment of ores containing uranium and vanadium are described in Merrit, R.C., The Extractive Metallurgy of Uranium, Colorado School of Mines Research Institute, 1971, pp. 422-542. These process apply to the above-ground operations in which the ores have to be brought up to the surface by mining. One such method utilizes strong acid leaching in two stages to improve the vanadium recovery. In the first stage a strong acid solution having a pH less than 1.8 is utilized to leach the uranium. The second stage utilizes a strong acid solution having a pH between 1.8 and 2.2 to leach the vanadium values therein.

Another process is to separate the ore so as to treat material containing uranium but with a relatively low vanadium content in a direct acid leaching step, while other ores higher in vanadium content are initially salt roasted. The roasted ores are water leached to remove soluble sodium vanadate, and the residue is then acid leached to dissolve the uranium.

Merritt describes another process for the recovery of uranium and vanadium from ores by initially subjecting the ores to a roasting and water leaching process to remove some of the vanadium. A carbonate leach process is followed to recover uranium and vanadium. Then the residue is further subjected to an acid leach process to recovery some more uranium and vanadium.

While the above processes have been successful to some extent for above ground operations, there is still a need for improved processes for recovering both uranium and vanadium from ores containing the same. Accordingly, the present invention provides a two-stage leaching process wherein the uranium and vanadium mixing is held to a minimum thus reducing the amount of solution subjected to separation steps. Furthermore, the present invention could be applied to either in-situ or surface leaching operations.

SUMMARY OF THE INVENTION

The present invention relates to an improved process for the recovery of uranium and other minerals, particularly vanadium, from uranium ore wherein at least part of the uranium in the ore is present as a refractory uranium-mineral complex. The uranium ore is initially subjected to a mild oxidative carbonate leach fluid to dissolve and remove the readily soluble uranium minerals. After substantially all the readily available uranium minerals are removed by the mild oxidative carbonate leaching system, the uranium ore is subsequently subjected to an oxidative chemically severe leach system to dissolve and remove the refractory uranium-mineral complex. In employing the above process, the amount of solution, containing both uranium and the mineral in the uranium-mineral complex, is kept to a minimum thus resulting in reduced amounts of fluid and uranium to be subjected to separation treatments.

DETAILED DESCRIPTION OF THE INVENTION

In the following description and examples, the invention will be described in connection with the recovery of uranium and vanadium values by the solubilization thereof from uranium bearing ores. However, it should be clear that the invention is applicable to the recovery of uranium and other minerals from uranium ores wherein at least part of the uranium is present as a refractory uranium-mineral complex. For example, other minerals found in a uranium-mineral complex include copper, nickel, thorium, scandium, the rare earths, and the like.

Uranium minerals frequently occur in the highly siliceous rocks and sedimentary deposits, generally as a mixture of the insoluble tetravalent form and the soluble hexavalent form. Uranium is also found in association with the silicates, phosphates, and zirconates of the rare earths and with columbium, tantalum, and thorium. In addition uranium is often associated with other metals such as vanadium, calcium, thorium, iron, bismuth, copper and zinc in various mineral forms.

In a uranium sandstone-type deposit in the Southwest region of the United States, two types of uranium minerals were found in the samples examined: a spheroidal uraninite ($UO_2$) sized at less than 1 $\mu$m and a monoclinic uranium-barium-vanadium (U-Ba-V) mineral sized at about 10 $\mu$m. In most of the ore horizons, uraninite was the predominant uranium mineral present. However, it was found that at least over one interval, the U-Ba-V mineral was of appreciable abundance. Accordingly, the present invention provides a process for the recovery of uranium and vanadium from the above described ores.

In applying the present invention to recover the uranium and vanadium from the above deposits, the ore is initially subjected to a mild oxidative carbonate leach fluid to dissolve and remove the readily accessible uraninite. After substantially all the uraninite minerals are removed, the ore is subsequently subjected to an oxidative chemically severe leach system to dissolve and remove the refractory U-Ba-V minerals.

The present invention is applicable to in-situ mining operations as well as surface recovery processes. The surface recovery processes are well known. Basically, the mined uranium-containing ore is introduced into holding tanks wherein the ore is subjected to leaching operations. Conventionally, in in-situ solution-mining processes, the leaching solution is brought into contact with the subterranenan deposit by injection into one or more injection wells which penetrate the deposit. The leaching solution is introduced into the injection well under sufficient pressure to force it out of the well bore into the adjacent deposit. Continued injection of leaching solution drives the solution through the deposit to one or more spaced-apart production wells where the solution is recovered for subsequent extraction of the mineral values. The number of injection and production wells and the spacing there between can vary depending upon the nature of the formation. Additionally, the pattern of injection and production wells can also vary although a typical pattern is the five-spot pattern consisting of a centrally disposed recovery well and four injection wells spaced around the recovery well. Alternatively, a given volume of leaching solution can be injected into a well to percolate in the surrounding formation. Following the injection phase, the well is pumped out and the injected leaching solution is recovered from the same well into which it had been injected.

The in-situ leaching operations are most efficient when a fairly uniform formation is the subject of the leaching process. All too often, however, and in fact in the majority of cases, the formations are not uniform as to both porosity and permeability. In some zones, the strata are sufficiently heterogenous as to severely alter flow patterns. Leaching fluids follow the higher permeability streaks thus by-passing portions of the ore body which results in the loss of recoverable uranium due to the lack of contact by leaching fluids. In many reservoirs 30–50 wt. % or more of uranium ore values may not be recoverable via in-situ leaching because of channeling of leachate through the high permeability zones. Accordingly, in a uranium formation exhibiting variations in permeability, the leaching fluids are injected into the formation and driven through the formation by means of aqueous driving solutions comprising viscosity builders or thickeners. Additionally, a thickening agent solution may be utilized as a blocking agent to divert the flow of the leaching solutions from the higher permeability zones of the formation. The use of such thickening agent solutions substantially reduces the fingering and channeling of the leaching solution thus increasing uranium recovery not by leaching action but through the provision of a more favorable mobility of the formation.

The tetravalent uranium must be oxidized to its soluble hexavalent form for leaching. In this connection an oxidizing agent can be introduced prior to or simultaneously with the leaching solution as a separate solution or as a gas. Conventionally, the process is operated continuously and the oxidizing agent and leaching solution are injected simultaneously. Preferred practice is to solubilize the oxidizing agent in the leaching solution. Additionally, it may be desirable to subject the uranium ore to a preoxidation step to be followed by the leaching solution optionally containing additional oxidant. Preoxidation may be achieved by injecting oxygen or oxygen-containing gas, such as air, into the formation. Preoxidation may also be achieved by subjecting the ore to solutions containing oxidants.

Any of the conventionally used oxidizing agents can be employed as the oxidant with the leaching solution in the present invention. For example, oxygen or oxygen-containing gases can be dissolved in water or the leaching solution or can be injected as gases to provide the necessary oxidizing agent. In addition, potassium permanganate, potassium ferricyanide, sodium hypochlorite, potassium peroxydisulfate, and hydrogen peroxide can be employed. Hydrogen peroxide and high pressure oxygen are preferred oxidizing agents.

Suitable mild carbonate leaching systems for use with the present invention can be defined as those carbonate leaching solutions having a pH of from about 6 to about 9.5. In addition to the conventional alkali metal carbonate and/or bicarbonate systems, carbon dioxide/oxygen systems are also included as suitable mild carbonate leaching fluids in the application of the present invention.

Suitable chemically severe leaching systems can be obtained by mixing appropriate quantities of sulfuric acid, nitric acid, hydrochloric acid and others in solution so that the final pH falls between about 1 and about 3. Metal sulfates and/or metal chlorides could be added to the chemically severe leaching systems to enhance the leaching rate. Furthermore, elevated temperatures may be applied to the chemically severe leaching systems to further enhance its severity or effectiveness.

In accordance with the present invention, the first stage mild carbonate leaching process is used to extract only the easy to leach urananite. Very little or no vanadium is extracted in that first stage. The second stage chemically severe leaching system is used to leach the remaining refractory uranium vanadate minerals for extraction of both uranium and vanadium. Then the pregnant leachate from each stage is subjected to conventional treatments for purification, concentration, and precipitation of the mineral. The treatment chosen will depend upon the overall process utilized.

For example, the uranium bearing solution obtained from the first stage leaching can be concentrated by loading on ion-exchange resin beads and then eluting the beads with sodium chloride solution. Caustic soda is then added to precipitate the dissolved uranium as uranium diurinate. To separate the uranium from vanadium, produced simultaneously as a result of the dissolution of refractory uranium-vanadate during the second stage leaching step, solvent extraction circuits can be used. To avoid the loading-interfering effect of ferric iron, the solution is first reduced by a reducing agent. By keeping the pH below 1.8, uranium can be extracted by an organic mixture of di(2-ethylhexyl) phosphoric acid (DHPA) and tributyl phosphate (TBP) in a base of kerosene. The concentrations of DHPA and TBP are each maintained at about 4 weight percent. The extracted uranium is then stripped by sodium carbonate solution and then added to the eluded solution obtained during stage one leaching. The vanadium in the remaining solution is extracted by adjusting the pH to from about 1.8 to about 2.2 and fed through the vanadium extraction circuit containing a mixture of about 7 weight percent DHPA and about 3 weight percent TBP. The extracted vanadium is stripped by sulfuric acid. Subsequently sodium chlorate is added to oxidize the vanadium and then the solution is neutralized with ammonia to precipitate acid red cake, which is then fused in a fusion furnace to produce black vanadium ore.

The present invention enhances uranium recovery by extracting not only the easy to leach but also refractory uranium minerals. Furthermore, vanadium is produced as a by-product. Additionally, the salt roasting step required in the prior known methods for vanadium extraction is not required in the present invention process.

The two-stage leaching method allows a preliminary separation of the majority of the uranium from vanadium minerals. Accordingly, the above separation minimizes the amount of the solution that has to be treated for uranium and vanadium separation.

EXPERIMENTS

In accordance with Table 1, 10 grams of uranium ore were treated with 50 C.C. of leachate solution for 30 hours. As can be seen from the data, the mild carbonate leaching systems (1 g/l sodium carbonate, 100 psi oxygen) produced minor amounts of vanadium while the sulfuric acid system produced a substantial amount of vanadium. These data also demonstrate that the chemically severe system containing strong oxidant (52.5 g/l NaOCl) has doubled the production of uranium, but produced very little vanadium. This indicates that although the use of strong oxidants can improve the recovery rate of uranium, the refractory uranium vanadates have remained essentially insoluble.

TABLE 1

Batch Leach Tests of Ores Containing Easy-to-Leach Uraninite and Refractory Uranium Vanadate

| Leachate Composition | pH | Effluent Concentrations (mg/l) | | |
|---|---|---|---|---|
| | | U | V | Ba |
| 5.0 g/l $H_2SO_4$<br>88.9 g/l $Fe_2(SO_4)_3$<br>0.5 g/l $NaClO_3$ | 1.57 | 942 | 111 | 0.93 |
| 52.5 g/l NaOCl<br>2.1 g/l $NaHCO_3$ | 8.93 | 601 | 0.97 | 2.43 |
| 1 g/l $NaHCO_3$<br>100 psi $O_2$ | 8 | 302 | 1.29 | 3.53 |

Although the present invention has been described with preferred embodiments it is to be understood that modifications and variations may be resorted to, without departing from the spirit and scope of this invention, as those skilled in the art will readily understand. Such modifications and variations are considered to be within the purview and scope of the appended claims.

What is claimed is:

1. An improved process for the recovery of uranium and other minerals from uranium ore wherein part of the uranium is present as refractory uranium-mineral complexes, the process comprising;
   a. subjecting the uranium ore to mild oxidative carbonate leach fluid to dissolve and remove uranium values other than the refractory uranium-mineral complexes;
   b. subsequently subjecting the uranium ore to an oxidative chemically severe acid leach system to dissolve and remove the refractory uranium-mineral complexes; and
   c. separating and recovering the uranium and other mineral species in the leachate fluids.

2. The process of claim 1 wherein the readily soluble uranium minerals comprise uraninite.

3. The process of claim 1 wherein the refractory uranium-mineral complexes comprise uranium-vanadium complexes.

4. The process of claim 1 wherein the mild carbonate leach fluid comprises alkali metal carbonates, alkali metal bicarbonates, or combinations thereof.

5. The process of claim 1 wherein the mild oxidative carbonate leach fluid has a pH not less than 6.

6. The process of claim 1 wherein the mild oxidative carbonate leach fluid comprises a carbon dioxide/oxygen leaching system.

7. The process of claim 1 wherein the chemically severe leach system comprises sulfuric acid, nitric acid, hydrochloric acid, or combinations thereof.

8. The process of claim 1 wherein the chemically severe leach system has a pH of from about 1 to about 3.

9. The process of claim 1 wherein the chemically severe leach system is applied at elevated temperatures.

10. The process of claim 1 wherein a metal sulfate is added to either or both of the mild carbonate leach fluid and the chemically severe leach system.

11. The process of claim 1 wherein the ore is subjected to a preoxidation step prior to either of the leaching systems.

12. The process of claim 11 wherein the preoxidation is achieved by subjecting the uranium ore to oxygen or oxygen-containing gas.

13. The process of claim 12 wherein the oxygen containing gas is air.

14. The process of claim 1 as applied in surface leaching operations.

15. The process of claim 3 wherein the uranium and vanadium in the chemically severe lechate are separated by utilizing ion-exchange resin.

16. The process of claim 3 wherein the uranium and vanadium in the chemically severe leachate are separated by solvent extraction methods.

17. The process of claim 1 as applied to the in-situ recovery of uranium from subterranean formations.

18. The process of claim 17 wherein a mobility control solution is applied prior to, with, or after each of the leaching solutions.

19. The process of claim 18 wherein the mobility control solution comprises a viscosity-building agent.

* * * * *